US012617314B2

(12) United States Patent
Ekman et al.

(10) Patent No.: US 12,617,314 B2
(45) Date of Patent: May 5, 2026

(54) HEAT MANAGEMENT SYSTEM FOR A FUEL CELL VEHICLE

(71) Applicant: Volvo Construction Equipment AB, Eskilstuna (SE)

(72) Inventors: Gordon Ekman, Moheda (SE); Roland Kvist, Braås (SE)

(73) Assignee: Volvo Construction Equipment AB, Eskilstuna (SE)

( * ) Notice: Subject to any disclaimer, the term of this patent is extended or adjusted under 35 U.S.C. 154(b) by 549 days.

(21) Appl. No.: 18/118,382

(22) Filed: Mar. 7, 2023

(65) Prior Publication Data

US 2023/0286417 A1 Sep. 14, 2023

(30) Foreign Application Priority Data

Mar. 14, 2022 (EP) ..................................... 22161874

(51) Int. Cl.
B60L 58/34 (2019.01)
B60L 7/22 (2006.01)
H01M 8/04701 (2016.01)

(52) U.S. Cl.
CPC ................. B60L 58/34 (2019.02); B60L 7/22 (2013.01); H01M 8/04738 (2013.01); B60L 2200/36 (2013.01); H01M 2250/20 (2013.01); H01M 2250/402 (2013.01)

(58) Field of Classification Search
CPC ......... H01M 8/04738; H01M 2250/20; H01M 2250/402; B60L 58/34; B60L 7/22; B60L 2200/36
USPC ....................................................... 429/428
See application file for complete search history.

(56) References Cited

U.S. PATENT DOCUMENTS

| 6,350,536 B1 | 2/2002 | Ban et al. |
| 6,488,345 B1 | 12/2002 | Woody et al. |
| 2005/0260480 A1* | 11/2005 | Hild .................. H01M 8/04761 |
| | | 429/433 |
| 2011/0244343 A1 | 10/2011 | Sugawara et al. |
| 2014/0287334 A1* | 9/2014 | Noh .................. H01M 8/04223 |
| | | 429/432 |

(Continued)

FOREIGN PATENT DOCUMENTS

| JP | 2009026498 A | 2/2009 |
| JP | 2015162947 A | 9/2015 |
| WO | 2012128770 A1 | 9/2012 |

OTHER PUBLICATIONS

Extended European Search Report for European Patent Application No. 22161874.7, mailed Sep. 9, 2022, 23 pages.

(Continued)

*Primary Examiner* — James M Erwin
(74) *Attorney, Agent, or Firm* — Sage Patent Group

(57) ABSTRACT

A heat management system for a fuel cell vehicle propelled by an electric traction motor includes a fuel cell system comprising a fuel cell configured to generate electric power when receiving hydrogen through a hydrogen inlet and oxygen through an oxygen inlet, wherein the fuel cell includes an outlet configured to expel exhaust water formed in the fuel cell, and a compressor including an inlet configured to receive ambient air, and an outlet, wherein the inlet of the compressor is arranged in downstream fluid communication with the outlet of the fuel cell and configured to pressurize a mixture of exhaust water expelled from the fuel cell and ambient air.

13 Claims, 3 Drawing Sheets

(56)     References Cited

U.S. PATENT DOCUMENTS

2015/0349361 A1     12/2015  Kwon et al.
2018/0108927 A1*     4/2018  Lee .................. H01M 8/04753
2019/0288305 A1*     9/2019  Ohashi .............. H01M 8/04111
2020/0017043 A1      1/2020  Kato et al.
2020/0067115 A1      2/2020  Wakatsuki et al.
2021/0111421 A1*     4/2021  Martuscelli ....... H01M 8/04164
2021/0151784 A1*     5/2021  Han .................. H01M 8/04231
2021/0347265 A1     11/2021  Park

OTHER PUBLICATIONS

Steinstraeter, et al. "Range Extension via Electrothermal Recupera-
tion," World Electric Vehicle Journal, May 25, 2020, 16 pages.
Search Report, Chinese Patent Application No. 2023102255555,
mailed Mar. 9, 2023, 3 pages.

* cited by examiner

HEAT MANAGEMENT SYSTEM FOR A FUEL CELL VEHICLE

CROSS REFERENCE TO RELATED APPLICATION

This application claims foreign priority to European Application No. 22161874.7 filed on Mar. 14, 2022, the disclosure and content of which is incorporated by reference herein in its entirety.

TECHNICAL FIELD

The present disclosure relates to a heat management system for a fuel cell vehicle propelled by an electric traction motor. The disclosure also relates to a method of controlling a heat management system. Although the disclosure will mainly be directed to a vehicle in the form of a working machine, the disclosure may also be applicable for other types of vehicles using a fuel cell and an electric traction motor for propulsion, such as e.g. trucks, buses, and other transportation vehicles.

BACKGROUND

The propulsion systems of vehicles are continuously developed to meet the demands from the market. A particular aspect relates to the emission of environmentally harmful exhaust gas. Therefore, vehicles propelled by electric machines and/or electric machine receiving electric power from hydrogen fuel cells have been increasingly popular, in particular for trucks and other heavy duty vehicles.

With reference to a hydrogen fuel cell, this component produces a substantial amount of exhaust water. As an example, 60 liters may be produced per 100 kW and hour. The exhaust water is expelled from the fuel cell as a mix of low temperature steam and condensed water.

Since the fuel cell expels a substantial amount of water, this water needs to be taken care of. Should the water be expelled to the ground surface there is a risk of soiling the operating path which can be hazardous. An option is to use a drain tank. However, such drain tank needs to be substantial in size for avoiding the need of emptying the tank too frequently.

It is therefore a desire to provide a heat management system for a fuel cell vehicle that is able to efficiently handle the water expelled during operation.

SUMMARY

It is thus an object of the present disclosure to at least partially overcome the above described deficiencies.

According to a first aspect, there is provided a heat management system for a fuel cell vehicle propelled by an electric traction motor, the heat management system comprising a fuel cell system comprising a fuel cell configured to generate electric power when receiving hydrogen through a hydrogen inlet and oxygen through an oxygen inlet, wherein the fuel cell comprises an outlet configured to expel exhaust water formed in the fuel cell, and a compressor comprising an inlet configured to receive ambient air, and an outlet, wherein the inlet of the compressor is arranged in downstream fluid communication with the outlet of the fuel cell and configured to pressurize a mixture of exhaust water expelled from the fuel cell and ambient air.

The compressor should thus be construed as a compressor arranged to pressurize gas in gaseous form as well as gas in liquid form, i.e. condensed form. The compressor may be operated in a number of manners. For example, the compressor may be an electric compressor operated by electric power received from e.g. the below described electric power system. As will also be described below, the compressor may be operated by an electric machine. In this example, the compressor is mechanically connected to the electric machine via e.g. a shaft. The electric machine in turn may be operated by electric power received from the electric power system. As a further example, the compressor is a mechanically operated compressor. In such a case, the compressor is connected to a rotating shaft for operation. The rotating shaft may, for example, be a shaft of an electric traction motor propelling the wheels of the vehicle. The compressor may in such case be connected to the shaft via a clutch for controlling operation of the compressor.

The present disclosure is based on the insight that a compressor can advantageously be used for transforming the exhaust water from the fuel cell into heated steam. The heated steam can, downstream the compressor, be expelled to the ambient environment through e.g. an exhaust pipe or chimney. The exhausted heated steam is environmentally friendly and will not soil the operating path. An advantage is thus that the heat management system removes the relatively large amount of water expelled from the fuel cell in an efficient and safe way.

Moreover, the compressor can also be advantageously used for dissipating excessive electric power when e.g. an energy storage system is unable to receive electric power during, for example, braking using electric traction motor(s) of the vehicle for controlling the vehicle speed. In particular, if the compressor is an electric compressor operated by electric power, the excessive electric power generated during braking can be fed to the compressor. In a similar vein, if the compressor is operated by an electric machine, the excessive electric power generated during braking can be fed to the electric machine, which in turn operates the compressor. Further, if the compressor is a mechanically operated compressor, the compressor can be controllably connected to e.g. the electric traction motor shaft which will increase the inertia and thereby reduce the level of electric power generated by the electric traction motor during braking.

According to an example embodiment, the heat management system may further comprise an air heating arrangement arranged in downstream fluid communication with the outlet of the compressor. According to an example embodiment, the air heating arrangement may be an electrical brake resistor, the electrical brake resistor comprises an electric resistive material connectable to the electric power system. The air heating arrangement can be incorporated into the energy management system for increasing the level of electric power that can be dissipated when the generated electric power cannot, for some reason, be fed to the energy storage system. By positioning the air heating arrangement downstream the compressor will enable for improved cooling of the air heating arrangement.

According to an example embodiment, the fuel cell system may comprise a water condenser arranged in fluid communication between the outlet of the fuel cell and the inlet of the compressor. Hereby, the water can be condensed and directed into the inlet of the compressor in a form more suitable for the compressor to pressurize. The compressor can hereby be less complex. Also, and according to an example embodiment, the fuel cell system may comprise a water conditioner fluidly connected to the water tank, the water conditioner is configured to condition the water contained in the water tank.

According to an example embodiment, the fuel cell system may comprise a water tank arranged in fluid communication between the outlet of the fuel cell and the inlet of the compressor. The water tank is advantageous as it can temporarily store water until the vehicle is operated in a driving mode at which it is more suitable to exhaust the heated steam generated by the compressor.

According to an example embodiment, the fuel cell system may comprise a valve arranged in fluid communication between the outlet of the fuel cell and the inlet of the compressor. The valve can hereby advantageously control the amount, and the time period, of directing exhaust water into the compressor.

According to an example embodiment, and as briefly indicated above, the heat management system may further comprise an electric traction motor configured to propel the vehicle and to controllably regenerate electric power during braking of the vehicle. Further, and according to an example embodiment, the electric traction motor may be electrically connected to an electric power system and configured to receive electric power from the electric power system during propulsion, and to feed electric power to the electric power system during braking.

According to an example embodiment, the electric power system may comprise an energy storage system configured to receive electric power from the electric traction motor during braking. According to an example embodiment, the energy storage system may be electrically connected to the fuel cell and configured to receive electric power generated by the fuel cell. It should however be readily understood that the fuel cell may also be arranged to feed electric power directly to the electric traction motor, thereby bypassing the energy storage system.

According to an example embodiment, and as described above, the heat management system may further comprise an electric machine electrically connectable to the electric power system of the vehicle, the electric machine being operable by electric power received from the electric power system. The heat management system may also comprise a control unit connected to the electric power system, the control unit comprising control circuitry configured to determine an electric power absorption capability of the energy storage system, compare the electric power absorption capability with a level of electric power generated by the electric traction motor during braking, and control the electric power system to feed electric power to the electric machine for operating the compressor when the level of electric power generated by the electric traction motor exceeds the electric power absorption capability. Hereby, excessive electric power can be efficiently dissipated when the energy storage system is unable to receive the electric power generated by the electric traction motor.

The electric power absorption capability should be construed as the level of electric power the energy storage system is able to receive and/or the amount of generated electric power per time unit the electric power system is able to receive. Hence, the energy storage system may be able to receive a certain amount of electric power until the state of charge (SoC) is reaching an upper, maximum threshold limit. The energy storage system may also be able to receive a certain amount of electric power per time unit, i.e. a maximum "flow velocity" of electric power.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

According to an example embodiment, the control unit may be connected to the fuel cell system, the control circuitry being further configured to control the fuel cell system to feed exhaust water to the inlet of the compressor when the electric power generated by the electric traction motor exceeds the electric power absorption capability.

According to an example embodiment, the heat management system may further comprise a muffler arranged in downstream fluid communication with the outlet of the compressor.

According to a second aspect, there is provided a method of controlling a heat management system of a fuel cell vehicle, the heat management system comprising a fuel cell system comprising a fuel cell configured to generate electric power when receiving hydrogen through a hydrogen inlet and oxygen through an oxygen inlet, wherein the fuel cell comprises an outlet configured to expel exhaust water formed in the fuel cell, a compressor comprising an inlet configured to receive ambient air and an outlet, wherein the inlet of the compressor is arranged in downstream fluid communication with the outlet of the fuel cell, an electric power system, and an electric traction motor configured to propel the vehicle and to generate electric power during braking, the electric traction motor being electrically connected to the electric power system, wherein the method comprises determining an electric power absorption capability of an energy storage system of the electric power system, comparing the electric power absorption capability with a level of electric power generated by the electric traction motor during braking, and controlling the compressor to pressurize a mixture of exhaust water expelled from the fuel cell and ambient air when the level of electric power generated by the electric traction motor exceeds the electric power absorption capability.

Effects and features of the second aspect are largely analogous to those described above in relation to the first aspect.

According to a third aspect, there is provided a fuel cell vehicle, comprising a heat management system according to any one of the embodiments described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features, and advantages, will be better understood through the following illustrative and non-limiting detailed description of exemplary embodiments, wherein.

DETAILED DESCRIPTION

Figure 1:
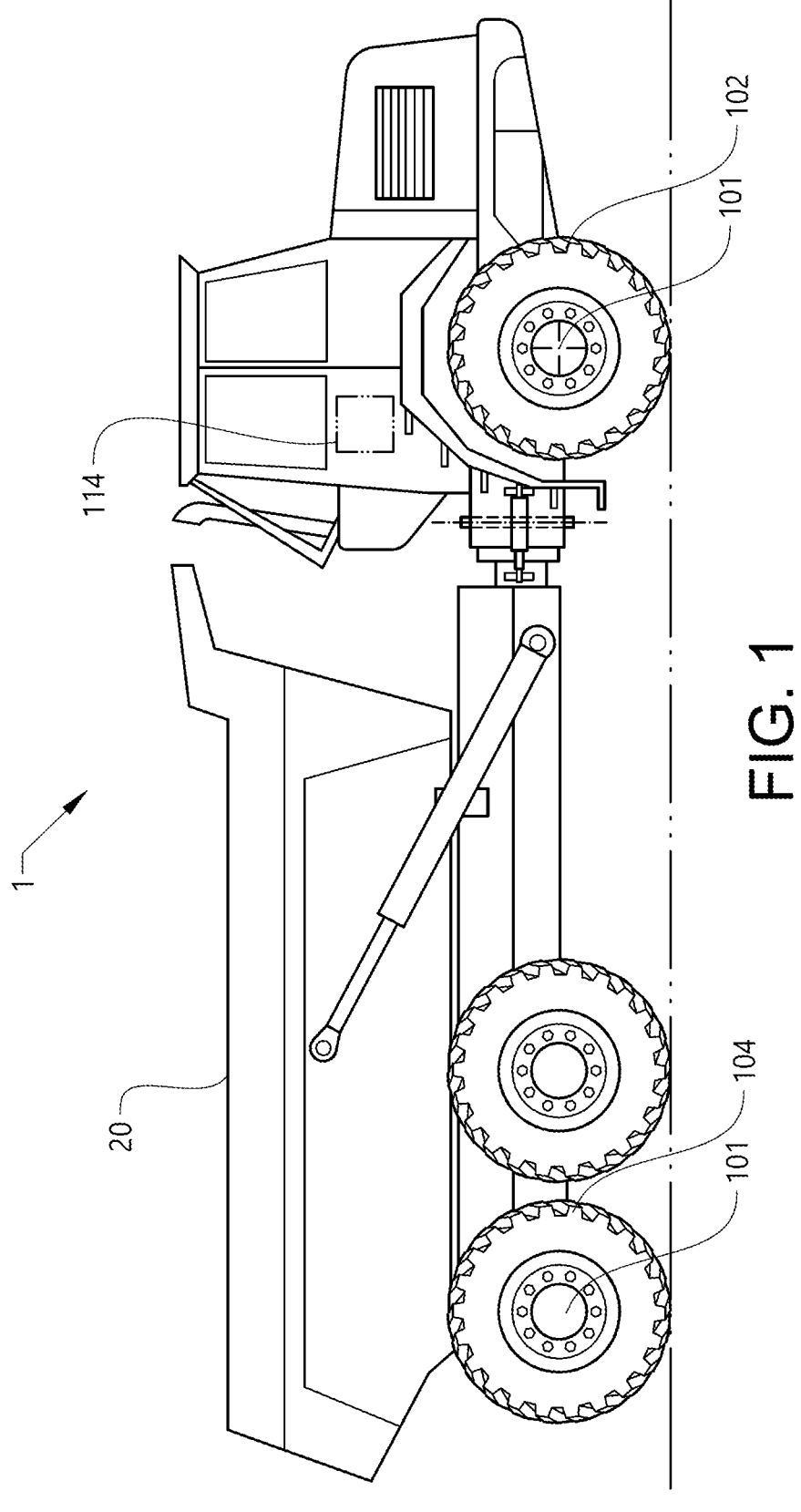
FIG. 1 is a lateral side view illustrating an example embodiment of a vehicle in the form of a working machine.

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

With particular reference to FIG. 1, there is provided a working machine 1 exemplified in the form of an articulated hauler. The working machine 1 comprises an implement 20 for transporting a load of material. Thus, the working machine 1 is arranged to carry material of various kind to different loading and unloading positions. The working machine in FIG. 1 comprises an electric traction motor 101. In FIG. 1, the electric traction motor 101 is depicted as a wheel hub motor arranged on the front wheels 102 and the rear wheels 104. The electric traction motor 101 is thus arranged to generate a torque during propulsion and the generate electric power during braking.

Figure 2:
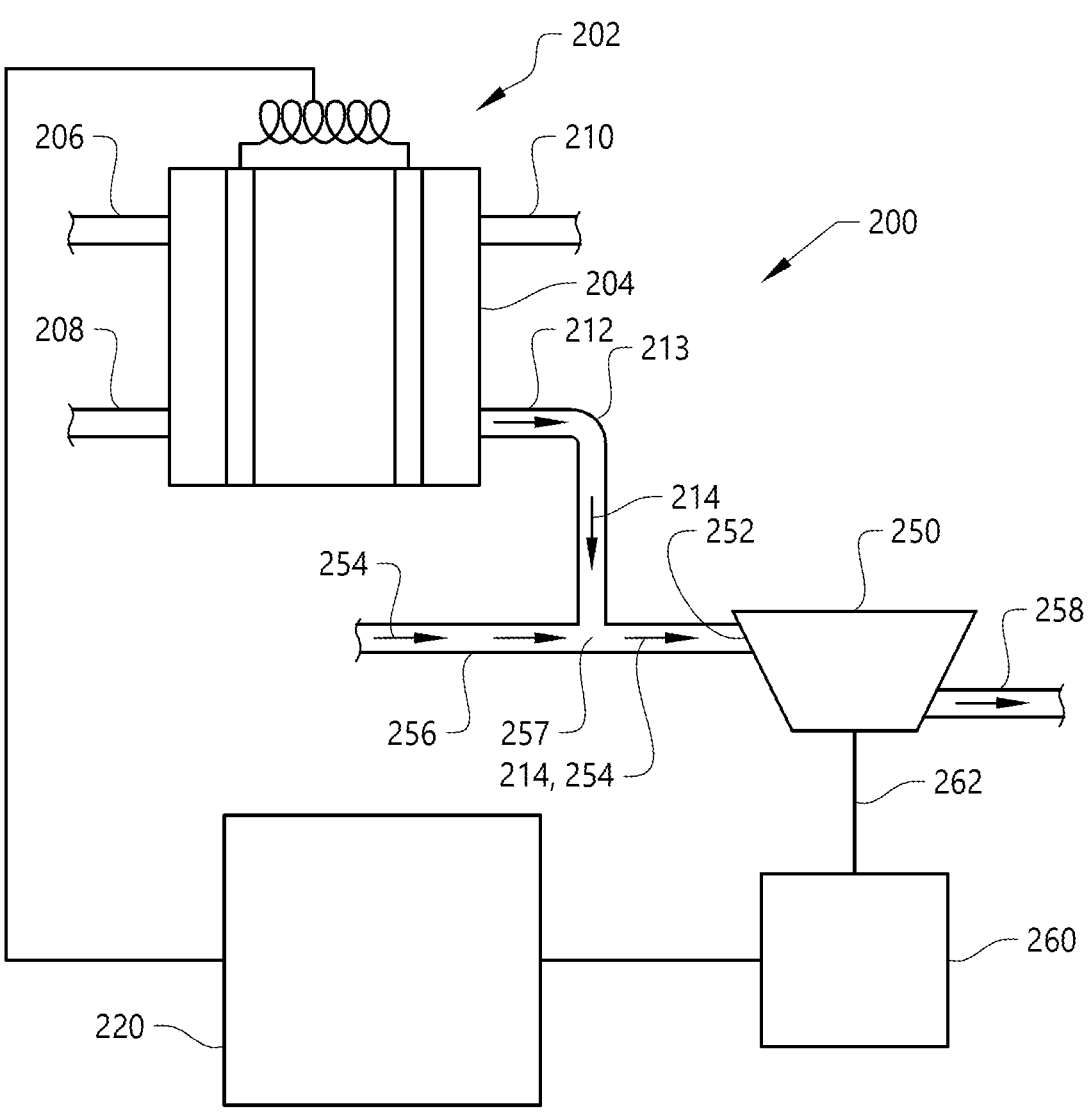
FIG. 2 is a schematic illustration of a heat management system according to an example embodiment.
Figures 3, 4:
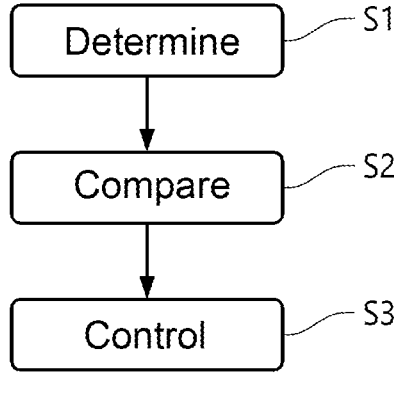
FIG. 3 is a schematic illustration of a heat management system according to an example embodiment.
FIG. 4 is a flow chart of a method of controlling a heat management system according to an example embodiment.

Furthermore, the working machine 1 comprises a fuel cell system (illustrated in FIGS. 2 and 3). The fuel cell system is arranged to generate electric power when receiving hydrogen and oxygen. The fuel cell system may be electrically connected to an energy storage system, e.g. a battery of the working machine, as well as directly electrically connected to the electric traction motor 101 for feeding electric power to the electric traction motor 101. As will be described in further detail below, the fuel cell system forms part of a heat management system of the working machine 1.

The working machine 1 is further provided with a control unit 114. The control unit 114 is configured to control various functionalities of the working machine 1 and forms part of the material transportation system.

The control unit 114 may include a microprocessor, microcontroller, programmable digital signal processor or another programmable device. The control unit 114 may also, or instead, include an application specific integrated circuit, a programmable gate array or programmable array logic, a programmable logic device, or a digital signal processor. Where the control unit 114 includes a programmable device such as the microprocessor, microcontroller or programmable digital signal processor mentioned above, the processor may further include computer executable code that controls operation of the programmable device.

In order to describe the heat management system in further detail, reference is now made to FIG. 2. The heat management system 200 described in the following is particularly advantageous for a working machine 1, such as the one depicted in FIG. 1. However, the heat management system 200 is also applicable for other types of working machines provided with electric traction motors for their propulsion, such as e.g. excavators, loaders, etc. The heat management system 200 may also be implemented in other types of vehicles, such as e.g. trucks, buses, cars, etc.

As described above, and as can be seen in FIG. 2, the heat management system 200 comprises a fuel cell system 202. The fuel cell system 202 comprises a fuel cell 204. The fuel cell 204 comprises a hydrogen inlet 206 and a hydrogen outlet 208. The hydrogen inlet 206 and hydrogen outlet 208 are arranged in fluid communication with a hydrogen tank (not shown). The fuel cell 204 thus receives hydrogen from the hydrogen tank. The fuel cell 204 also comprises an oxygen inlet 210 and an outlet 212. The fuel cell 204 hence receives oxygen, e.g. air, from the oxygen inlet 210. During operation of the fuel cell 204, electric power is generated by the fuel cell 204 when receiving hydrogen and oxygen. Also, when generating electric power, the fuel cell 204 expels exhaust through the outlet, which exhaust contains at least exhaust water 214 but sometimes also oxygen to some extent. The electric power generated by the fuel cell 204 is fed to an electric power system 220 of the working machine 1. The electric power system 220 may comprise an energy storage system (illustrated as 306 in FIG. 3). Hence, the fuel cell is electrically connected to the electric power system 220. Although not depicted in the figures, the fuel cell 204 may also be directly connected to the electric traction motor 101 for feeding electric power to the electric traction motor 101 without having to pass the electric power system 220.

Moreover, the heat management system 200 further comprises a compressor 250. The compressor 250 comprises an inlet 252 for receiving a flow of ambient air 254. The ambient air 254 is thus directed through a compressor inlet conduit 256 before entering the inlet 252. Although not depicted in the figures, the compressor inlet conduit 256 may be provided with a filter such that the ambient air fed into the compressor is relatively clean and free from debris and particles.

Furthermore, the inlet 252 of the compressor 250 is arranged in downstream fluid communication with the outlet 212 of the fuel cell 204. According to the exemplified embodiment depicted in FIG. 2, the outlet 212 of the fuel cell 204 is connected to an intersection portion 257 of the compressor inlet conduit 256 at a position upstream the inlet 252. Thus, a fuel cell outlet conduit 213 is arranged between the outlet 212 and the intersection portion 257. The compressor 250 hereby receives a mixture of exhaust water 214 expelled from the fuel cell 204 and ambient air 254. The compressor 250 pressurizes the mixture of exhaust water 214 and ambient air 254 and feeds the pressurized mixture towards the ambient environment via a compressor outlet conduit 258. In further detail, the compressor 250 will pressurize the mixture of exhaust water 214 and ambient air 254, which mixture will be transformed into heated steam which is directed towards the ambient environment.

In the example embodiment depicted in FIG. 2, the compressor 250 is connected to, and operated by, an electric machine 260. A compressor shaft 262 is mechanically connecting the electric machine 260 and the compressor 250 to each other. The electric machine 260 is in turn electrically connected to the electric power system 220. During e.g. braking using the electric traction motor 101, the electric power system 220 can be configured to feed electric power generated by the electric traction motor 101 to the electric machine 260 for operating the compressor 250. This may be particularly advantageous if the electric traction motor 101 generates surplus electric power that can not be absorbed by the energy storage system. The electric machine 260 is hereby operable to dissipate such surplus electric power by controlling the compressor to pressurize the mixture of exhaust water 214 and ambient air 256. It should thus be readily understood that the electric machine 260 is different from the electric traction motor 101 depicted in FIG. 1 and described above.

The compressor 250 may however be operated by other means than the above described electric machine 260. For example, the compressor 250 may be connected to, and operable by, an electric traction motor shaft (not shown) of one of the electric traction motors 101. The compressor 250 is in such case a mechanically operated compressor. During e.g. braking, the compressor 250 is controllably connected to the electric traction motor shaft and acts as an inertia, which reduces the level of electric power generated by the electric traction motor. As a still further example, the compressor may be an electrically controlled compressor operable by electric power received directly from e.g. the electric power system 220.

In order to describe the heat management system 200 according to another example embodiment, reference is now made to FIG. 3. The features described above in relation to FIG. 2 are also included in the embodiment described in the following. However, for simplifying the reading, some of the features are not included in the illustration described below.

As depicted in FIG. 3, the heat management system 200 comprises an air heating arrangement 302. The air heating arrangement 302 is arranged in downstream fluid communication from the compressor 250, i.e. the pressurized mixture of exhaust water and ambient air is fed to the air heating arrangement 302 via the compressor outlet conduit 258. Hence, the air heating arrangement 302 is arranged in the compressor outlet conduit 258. The air heating arrangement 302 may be an electrical brake resistor. The electrical brake resistor comprises an electric resistive material (not shown) connected to the electric power system 220. The electric power system 220 can hereby feed surplus electric power to the electrical brake resistor when there is a desire to dissipate electric power. Such situation may occur when generating electric power by the electric traction motor 101 during braking. In further detail, when the energy storage system 306 is unable to be charged by electric power, or when there is a desire for other reasons of not feeding electric power to the energy storage system 306, the electrical brake resistor can be used for dissipating electric power.

Moreover, the energy storage system 200 may also comprise a muffler 304 in the compressor outlet conduit 258. The muffler 304 may be arranged in downstream fluid communication with the outlet of the compressor 250, and may also be downstream the air heating arrangement 302.

As is also depicted in FIG. 3, the heat management system 200 also comprises a condenser 310 and a water tank 312 in fluid communication between the outlet 212 of the fuel cell and the inlet of the compressor 250. In further detail, the condenser 310 and the water tank 312 are arranged in the fuel cell outlet conduit 213, where the water tank 312 is arranged in downstream fluid communication with the condenser 310. The water tank 312 is also connected to a water conditioner 314. The water tank 312 expelled from the fuel cell can thus be stored in the water tank 312 and conditioned by the water conditioner 314 for being better fit to enter the compressor 250.

Moreover, the heat management system 200 also comprises a valve 316. The valve 316 is connected to the control unit 114 and the control unit thus controls the valve 316 to assume an open position in which water from the fuel cell 202 is allowed to enter the inlet of the compressor 250, as well as to control the valve 316 to assume a closed position in which the water from the fuel cell 202 is prevented from reaching the inlet of the compressor 250. During operation of the fuel cell 202 and the valve 316 is closed, the water level in the water tank 312 will increase, i.e. raise. When the valve is opened, the water level will reduce.

Furthermore, during operation of the working machine 1 and now also with reference to FIG. 4, the control unit 114 is also configured to determine S1 an electric power absorption capability of the energy storage system 306. In detail, the control unit 114 determines how much electric power the energy storage system 306 is able to obtain. The control unit 114 compares S2 the electric power absorption capability with a level of electric power generated by the electric traction motor 101 during braking. If the level of electric power generated by the electric traction motor 101 exceeds the electric power absorption capability, the control unit 114 controls the electric power system 220 to feed electric power to the electric machine 260 for operating the compressor 250. The control unit 114 can also in such situation control the valve to assume an open position to allow exhaust water from the fuel cell to enter the inlet of the compressor 250. The control unit 114 may also control the electric power system 220 to feed electric power to the air heating arrangement 302 for increasing the electric power dissipation.

It is to be understood that the present disclosure is not limited to the embodiments described above and illustrated in the drawings; rather, the skilled person will recognize that many changes and modifications may be made within the scope of the appended claims.

The invention claimed is:

1. A heat management system for a fuel cell vehicle propelled by an electric traction motor, the heat management system comprising:
    a fuel cell system comprising a fuel cell configured to generate electric power when receiving hydrogen through a hydrogen inlet and oxygen through an oxygen inlet, wherein the fuel cell comprises an outlet configured to expel exhaust water formed in the fuel cell, and
    a compressor comprising an inlet configured to receive ambient air, and an outlet connected to an ambient environment,
    wherein the inlet of the compressor is arranged in downstream fluid communication with the outlet of the fuel cell and configured to pressurize a mixture of exhaust water expelled from the fuel cell and ambient air, wherein the pressurized mixture is configured to be directed towards the ambient environment.

2. The heat management system according to claim 1, wherein the heat management system further comprises an air heating arrangement arranged in downstream fluid communication with the outlet of the compressor.

3. The heat management system according to claim 2, wherein the air heating arrangement is an electrical brake resistor, the electrical brake resistor comprises an electric resistive material connectable to the electric power system.

4. The heat management system according to claim 1, wherein the fuel cell system comprises a water tank arranged in fluid communication between the outlet of the fuel cell and the inlet of the compressor.

5. The heat management system according to claim 1, wherein the fuel cell system comprises a valve arranged in fluid communication between the outlet of the fuel cell and the inlet of the compressor.

6. The heat management system according to claim 1, wherein the heat management system further comprises an electric traction motor configured to propel the vehicle and to controllably regenerate electric power during braking of the vehicle.

7. The heat management system according to claim 6, wherein the electric traction motor is electrically connected to an electric power system and configured to receive electric power from the electric power system during propulsion, and to feed electric power to the electric power system during braking.

8. The heat management system according to claim 6, wherein the electric power system comprises an energy storage system configured to receive electric power from the electric traction motor during braking.

9. The heat management system according to claim 8, wherein the energy storage system is electrically connected to the fuel cell and configured to receive electric power generated by the fuel cell.

10. The heat management system according to claim 8, wherein the heat management system further comprises an electric machine electrically connectable to the electric power system of the vehicle, the electric machine being operable by electric power received from the electric power system, and a control unit connected to the electric power system, the control unit comprising control circuitry configured to:

determine an electric power absorption capability of the energy storage system, compare the electric power absorption capability with a level of electric power generated by the electric traction motor during braking, and control the electric power system to feed electric power to the electric machine for operating the compressor when the level of electric power generated by the electric traction motor exceeds the electric power absorption capability.

11. The heat management system according to claim 10, wherein the control unit is connected to the fuel cell system, the control circuitry being further configured to:

control the fuel cell system to feed exhaust water to the inlet of the compressor when the electric power generated by the electric traction motor exceeds the electric power absorption capability.

12. A method of controlling a heat management system of a fuel cell vehicle, the heat management system comprising a fuel cell system comprising a fuel cell configured to generate electric power when receiving hydrogen through a hydrogen inlet and oxygen through an oxygen inlet, wherein the fuel cell comprises an outlet configured to expel exhaust water formed in the fuel cell, a compressor comprising an inlet configured to receive ambient air and an outlet connected to an ambient environment, wherein the inlet of the compressor is arranged in downstream fluid communication with the outlet of the fuel cell, an electric power system, and an electric traction motor configured to propel the vehicle and to generate electric power during braking, the electric traction motor being electrically connected to the electric power system, wherein the method comprises:

determining an electric power absorption capability of an energy storage system of the electric power system, comparing the electric power absorption capability with a level of electric power generated by the electric traction motor during braking, and controlling the compressor to pressurize a mixture of exhaust water expelled from the fuel cell and ambient air when the level of electric power generated by the electric traction motor exceeds the electric power absorption capability, and feed the pressurized mixture towards the ambient environment.

13. A fuel cell vehicle, comprising a heat management system according to claim 1.

* * * * *